3,198,947
APPARATUS FOR PRODUCING VISUAL IMAGES OF X-RAYED OBJECTS
Robert A. Arrison, Jr., Wellesley, and Cornelius G. van der Velden, Framingham, Mass., assignors, by mesne assignments, to Laboratory for Electronics, Inc., Boston, Mass., a corporation of Delaware
Filed Feb. 21, 1961, Ser. No. 90,741
5 Claims. (Cl. 250—99)

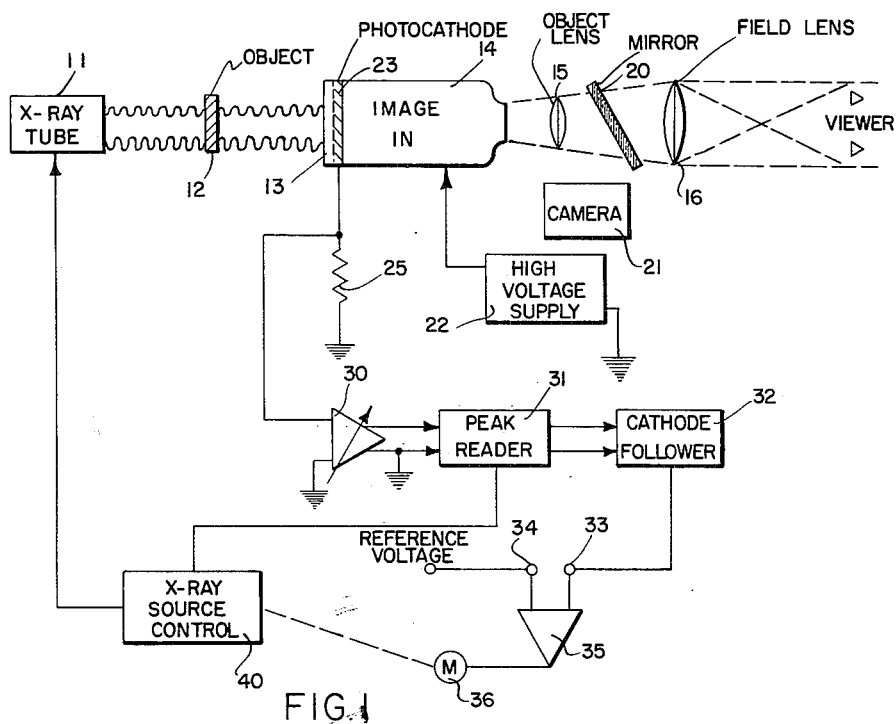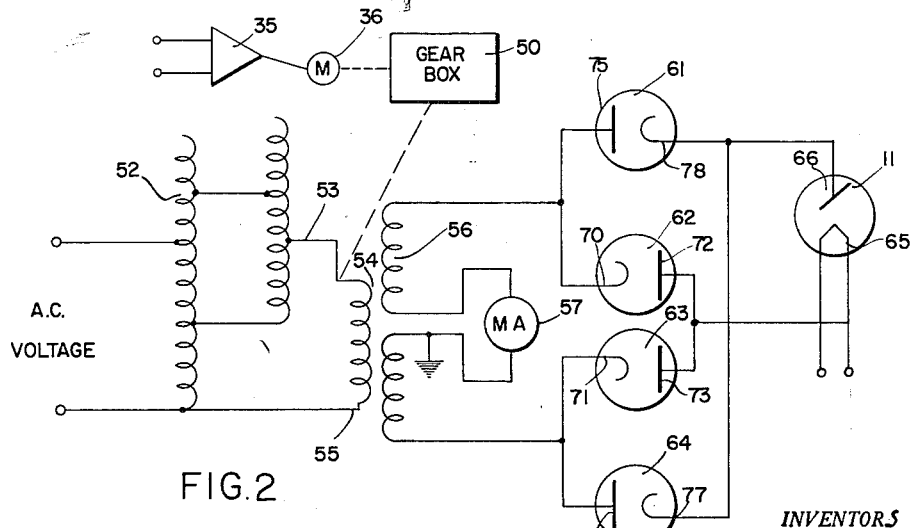

This invention relates in general to diagnostic X-ray apparatus and, more particularly, to a system for controlling the brightness of a fluoroscopic image produced by X-rays.

X-ray equipment, suitable for medical diagnosis, must be capable of producing visual images both for direct viewing by the examining radiologist and for motion picture studies in conjunction with direct viewing. One of the important elements in a system suitable for this purpose is an image intensifier element. The image intensifier element serves to amplify the intensity of the visual image produced by the X-rays on a fluorescent screen and thus provide increased brightness on an output viewing screen. The output of this image intensifier may be viewed directly through some optical coupling system or may be viewed by a motion picture camera to provide motion pictures of the X-ray image. Frequently, the motion picture studies will be done in conjunction with scanning of the X-ray beam over a particular area of the patient. One of the problems associated with such a system is that of variation in brightness of the image. For example, if the X-ray beam is scanned from a relatively low density area to a relatively high density area of the patient, the brightness of the produced image will decrease with increased density and, therefore, the clarity and contrast of the resultant pictures will similarly vary. In general, maximum brightness will provide the clearest and highest contrast pictures, however, a limitation on brightness is imposed by considerations of roentgen dosage on the patient. It is, therefore, valuable to have an automatic brightness control which will maintain the brightness of the produced image at a substantially constant value despite variations in the density of the patient or the like.

It has been the practice in some past designs of equipment of this nature to use a photoelectric element viewing the output image of the image intensifier as a transducer for providing an output signal varying with the brightness of the image. This output signal is then fed back to control one of the factors of the X-ray generation which affect brightness, such as the duration of the exposure, the current through the X-ray tube, or the high voltage applied to the X-ray tube. One of the problems associated with utilizing a photoelectric device of this type arises from the fact that it may also respond to variations in ambient light feeding back into the system. Hence if the ambient light in the area increases, the control system may reduce the brightness of the image below the desired level. Another problem associated with this type of brightness control lies in variations which occur within the photoelectric transducing element itself. For example if the sensitivity of this element varies, then a corresponding correction will be made in the X-rays generated, despite the fact that no variation has occurred in the brightness of the produced image.

It is, therefore, a primary object of the present invention to provide a brightness control system substantially unaffected by variations in the ambient light within the area.

It is another object of the present invention to provide a brightness control system in which the element producing the signal indicative of the brightness is itself a portion of the image producing apparatus.

It is still another object of the present invention to provide an economic, reliable brightness control for operation in conjunction with cinematic equipment.

Broadly speaking, the brightness control of the present invention utilizes the image intensifier element itself as a transducer to derive an electrical signal indicative of the brightness of the produced image. The input element of an image intensifier tube consists of a fluorescent screen adapted to produced light impulses in response to impinging X-rays and a photo cathode adapted to produce electrons in response to the photons emitted from the fluorescent element. The electrons emitted from the input element are then accelerated through electrostatic fields to impinge upon an output phosphor. The increased energy of the electron striking the output phosphor results in an increase in the number of photons emitted from the output phosphor over that emitted from the input fluorescent screen in response to the initiating X-ray. The current flowing through the photo cathode as a result of the motion of the electrons emitted from it is then directly related to the number of electrons released, which is in turn directly related to the number of photons emitted from the input fluorescent screen. This current can then be utilized as a signal indicative of the brightness of the input visual image. The amplification of the image intensifier tube may be maintained substantially constant by maintaining a substantially constant electric field across it and consequently the photocathode current provides an excellent indication of the brightness of the produced image. Since the image intensifier element is itself light sealed at the input end, then variations in the ambient light do not significantly affect the cathode current and consequently the signal produced is substantially independent of variations in ambient light. The current derived from the photo cathode may be drawn through a signal generating resistor and the voltage developed can be compared to a reference voltage, with the difference between the developed signal and the reference voltage being fed through a control circuit to vary the high voltage applied to the X-ray tube and hence the number of X-rays impingent upon the input screen of the image intensifier. The desired level of brightness may be preset by setting the reference voltage at a desired level or by variation of the signal generated in response to a particular current value through the photo cathode.

Other objects and advantages will become apparent from the following detailed description when taken in conjunction with accompanying drawing in which:

FIG. 1 is an illustration in block diagrammatic form of a brightness control system in acordance with the principles of this invention;

FIG. 2 is an illustration in schematic form of a high voltage control portion of an automatic brightness control system in acordance with the principles of this invention.

With reference now to FIG. 1, an X-ray generating tube 11 emits X-rays impingent upon an object 12 and the X-ray image of this object is cast upon the input element 13 of image intensifier unit 14. An optical coupling system consisting of an object lens 15 and a field lens 16 permits a viewer to observe the output image on the image intensifier. A partially transmissive mirror 20 serves to reflect the image into a motion picture camera unit 21 for motion picture recording of the images. High voltage supply 22 provides high voltage to the image intensifier unit 14. The input element 13 of the image intensifier unit consists of a phosphor adapted to emit photons in response to X-rays impinging upon it, sandwiched together with a photo cathode which emits electrons in response to photons from the phosphor. The photocathode 23 is electrically connected through resistor 25 to ground. A variable gain amplifier 30 has its input connected across resistor 25 and provides an output to peak reader unit 31. The output of the peak reader 31 is coupled through cathode follower 32 to one input terminal 33 of null balancing amplifier 35. The other input 34 of the null balancing amplifier is connected to a reference voltage source. The null balance amplifier 35 provides a motor drive output in response to any voltage imbalance between the input terminals 33 and 34. This motor drive output is mechanically coupled to X-ray source control unit 40. The source control unit 40 provides a signal back to the peak reader 31 and also, of course, directly to the X-ray tube 11.

Having described the connections of the components within this system, its operation will now be discussed. The X-ray tube 11 is a tube capable of generating X-rays in response to signals applied to it from a source control unit 40. Typically the X-ray tube 11 may be a grid controlled X-ray tube. This tube emits X-rays when it is discharged. The energy and beam current of the emitted X-rays depend upon the applied high voltage and filament current, respectively, of the tube. The timing of the discharge within the tube is controlled by the pulse applied to its grid. The X-rays emitted from the tube 11 impinge upon object 12 and a shadow X-ray image of object 12 is cast upon the input element 13 of the image intensifier unit 40. The image intensifier unit has an input element consisting, as mentioned earlier, or a phosphor, which emits light in response to impinging X-rays, sandwiched with a photo cathode emitting electrons in response to impingent light. The electrons so emitted are accelerated through an electrostatic field. High voltage supply 22 provides the potential for maintaining this field. The accelerated electrons strike the output phosphor of the image intensifier creating there an intensifier visual image of the X-ray image cast upon its input. As previously described, the optical lens system enables a viewer to observe this output image. The photo cathode element 23 is coupled through a resistor 25 to ground. Hence, the emission of electrons from the photo cathode draws current through this resistor, thereby providing a voltage drop across it. Since this current is related to the number of electrons emitted, it is therefore related to the average brightness of the input phosphor. Typically, this current would be in the order of $10^{-9}$ amps. and, hence, if resistor 25 has a value of 1 megohm, the developed potentials will be in the order of a few millivolts. Amplifier 30 is a typical stabilized gain amplifier, in which the gain may be set at any one of a group of preselected values. Typically, the amplifier might have a gain in the order of $10^3$ or $10^4$. The output of amplifier 30 is provided to peak reader unit 31. The peak reader unit is a unit which has a short charging time constant and a very long discharge time such that it will virtually instantaneously charge up to the peak voltage applied to it, but this voltage will leak off at a very slow rate. The X-ray source control 40 provides a signal to the peak reader 31 for every X-ray pulse to discharge the peak reader to its base level just prior to the generation of the X-rays from X-ray tube 11. Thus, the output of the peak reader provides a signal representing the maximum potential developed across resistor 25 during each pulse. The output of the peak reader is coupled through a cathode follower to one input terminal 33 of balancing amplifier 35. Balancing amplifier 35 is a typical null balancing amplifier having two input terminals. When there is a voltage imbalance between the input terminals, a motor drive output 36 is energized until the input imbalance is equalized. Applied to the second terminal 34 of balancing amplifier 35 is a reference voltage source, which is selected to correspond to the signal at the output of cathode follower 32 for a typical desired brightness, when the gain of amplifier 30 is set approximately in the middle of its range. The motor drive output 36 is mechanically coupled to the X-ray source control unit 40. The X-ray source control provides not only the pulse timing sequence applied to the grid of X-ray tube 11, but also the high voltage applied to the X-ray tube, which controls the quantum energy of the emitted X-rays, and the filament current for the X-ray tube. Typically, the motor control might be coupled to a variable autotransformer supplying A.C. power to the primary winding of the high voltage transformer.

The peak reader inclusion within this system provides at least two significant advantages. First, a peak reader system requires less amplification than, for example, generating a signal corresponding to the average signal. As previously indicated, the pulses at the input to the amplifier have a peak value of only a few millivolts, hence the average value would require a system responsive to pulses only a fraction of this value. The second advantage is particularly significant when the system is being operated for motion picture studies. In one method of operation for motion picture studies, a grid controlled X-ray tube is pulsed once for each shutter opening of the camera. A typical duration of each pulse might be four milliseconds at a repetition rate varying from 1 to 60 pulses per second. The response time of the motorized correction would typically be in the order of one second for a full scale change. Since a brightness signal must be maintained at the input terminal 33 for the period required for correction, this imposes a requirement of a long time constant on the decay of the brightness signal. However, at fast repetition rates such as 60 pulses per second, the brightness signal must be capable of rapid changes in level. The peak reader provides both characteristics in that it responds rapidly to changes in the peak signals, yet maintains the peak level until it is discharged by a signal from the source control unit 40.

In operating the brightness control illustrated in FIG. 1, a reference voltage is first selected corresponding to the signal developed at the input terminal 33 for a typical desired brightness when the amplifier gain is at a reasonable value. If, then, the brightness of the input image varies from this value, a signal varying in the corresponding direction is provided at the output of cathode follower 32 and an imbalance is created between input terminal 33 and input terminal 34 of balancing amplifier 35. The output motor 36 then varies the tap position on the autotransformer, controlling the high voltage supplied to the X-ray tube, in a direction such that the X-ray energy emitted from the tube is either increased or decreased, depending upon the direction of variance from the desired brightness. Variations in ambient light do not affect the operation of this brightness control system since the image intensifier element is entirely sealed from outside light except at its output phosphor. The construction of the tube is such that very little light is fed back from the output to the input of the image intensifier, hence the overall operation of the brightness control system remains substantially independent of variations in ambient light. If it is desired to change the brightness level selected, this may be done by varying the gain control of amplifier 30. For example, to increase the brightness, the gain control is turned down such that more current through resistor 25 is required in order to match the reference voltage applied to input terminal 34.

While in the above example the motorized control responsive to variations in brightness affected changes in the high voltage supplied in the X-ray tube, the brightness may also be controlled by varying either the filament current or the duration of the pulse applied to the grid of the X-ray tube. Again, while the discussion above described a pulsed-X-ray apparatus, the same brightness control may be employed with regard to a non-pulsed type of X-ray operation. In this latter case, the peak reader may also be controlled by varying either the filament it provides virtually continuous monitoring of the brightness of the produced image.

With reference now to FIG. 2, a circuit for controlling the value of high voltage applied to a grid controlled, X-ray tube is shown. The controlling element is motor 36 which is energized whenever the input terminals of amplifier 35 have a potential difference between them. The motor 35 drives in one direction when this difference is positive and in the opposite direction when it is negative. A variable autotransformer 52 is coupled across the A.C. power line and the position of the movable tap 53 is mechanically coupled to the motor 36 through gear box 50. The movable tap 53 is electrically connected to one end of the primary winding 55 of transformer 54. The other end of this primary winding 55 is connected to the end of the autotransformer 52 winding. The transformer 54 has a split secondary 56 coupled together through milliammeter 57. One side of the meter is grounded. The other ends of each half of the secondary are each coupled to the cathodes 70 and 71 of diodes 62 and 63, respectively, which have their anodes 72 and 73 connected together. The anodes 72 and 73 are also connected to the cathode 65 of X-ray tube 11. The ends of each half of the secondary 56 are also connected to the anodes 75 and 76 of diodes 61 and 64, respectively, which have their cathodes 77 and 78 connected together and also connected to the anode 66 of X-ray tube 11.

The diodes 61, 62, 63 and 64 form a full wave rectifier, so that a rectified A.C. voltage is applied across X-ray tube 11. The magnitude of this voltage is determined by the position of tap 53 on autotransformer 52. Variations on the input of amplifier 35 then provide corresponding variation in the magnitude of high voltage applied to the X-ray tube. The input to the amplifier 35 is supplied as illustrated in FIG. 1 from the peak reader 31 and image intensifier 14 and a reference voltage. The entire circuit is arranged such that, when the signal from the peak reader decreases, the motor drive 36 moves the tap 53 in a direction to increase the high voltage applied to X-ray tube 11. This increase in turn tends to increase brightness and the process continues until the input to amplifier 35 is balanced.

While, as previously mentioned, the brightness may be controlled by varying the duration of the X-ray exposure or the beam current, controlling the high voltage in the above described manner provides a particularly effective control. This effectiveness stems from the "memory" characteristic of the autotransformer; that is, each correction on the autotransformer has for its starting point the previous position of the autotransformer tap. Thus, each correction is initiated from a point somewhere near the desired operating position. By this means a build up through lower voltages (where skin dosage is high) is avoided, and, of course, the smaller change required tends towards faster response. This advantage applies particularly to fluoroscopic technique, in which the radiologist will generally make several observations, corresponding to several X-ray pulses under the same conditions.

Having described the invention herein, it is apparent that many modifications and improvements may now be made by those skilled in the art, and it is therefore intended that the invention disclosed herein should be limited only by the spirit and scope of the appended claims.

What is claimed is:

1. Apparatus for providing a visual image of an X-rayed object comprising an X-ray generator adapted to emit a beam of X-rays through said object; a high voltage source coupled to said X-ray generator, the quantum energy of said emitted X-rays being related to the value of said high voltage; an image intensifier element disposed in a manner to receive said X-ray beam after it has passed through said object, said image intensifier having an input phosphor and an output phosphor, said input phosphor being adapted to emit light in response to impingent X-rays; a photoelectric cathode included within said image intensifier element and disposed in juxtaposition to said input phosphor, said photoelectric cathode being adapted to emit electrons in response to light impingent upon it from said input phosphor; means adapted to accelerate said electrons emitted from said photo cathode to said output phosphor for producing a visual image thereon at increased brightness relative to the brightness of said input phosphor; signal generating means coupled to said photo cathode and adapted to provide as an output a voltage signal having an amplitude varying in accordance with variations in the number of electrons emitted from said photo cathode; amplifying means coupled to the output of said signal generator and adapted to provide as an output said signal generator output signal amplified by a preselected factor; a balancing amplifier having first and second input terminals and adapted to provide an output in response to any difference in voltage between said first and second input terminals; a source of reference voltage coupled to said first input terminal, said second input terminal being coupled to the output of said amplifier means; means responsive to the output of said balancing amplifier for varying the value of said high voltage in a manner tending to decrease any voltage imbalance between said first and second input terminals on said balancing amplifier.

2. Apparatus in accordance with claim 1 wherein said balancing amplifier provides an output motor drive in response to any imbalance at its input terminals, said output motor drive driving in a first direction when the voltage at said first terminal exceeds the voltage at said second input terminal and in the opposite direction when the voltage at said second terminal exceeds the voltage at said first terminal and wherein said means for varying said high voltage comprises a variable autotransformer providing input power to said high voltage source and means coupling said motor drive output to said variable autotransformer in a manner to increase said high voltage when said motor drive output is in said first direction and to decrease said high voltage when said motor drive output is in said opposite direction.

3. Apparatus for providing visual images of an X-rayed object comprising, an X-ray generator adapted to emit a beam of X-rays through said object in response to a triggering signal; trigger means adapted to provide a series of trigger signals to said X-ray generator; an image intensifier element having an input phosphor and an output phosphor, said input phosphor being adapted to emit light in response to X-rays impingent upon it, said output phosphor being adapted to produce a visual image of said input phosphor at increased brightness; a photocathode disposed within said image intensifier element in close juxtaposition to said input phosphor and adapted to emit electrons in response to photons impingent upon it; signal generator means adapted to produce a voltage signal varying in accordance with variation in the number of said emitted electrons; peak reader means adapted to provide an output signal having an amplitude related to the peak amplitude of said voltage signal for the period between each of said trigger signals; a balancing amplifier having first and second input terminals and adapted to provide an energized output in response to any difference in signals applied to said first and second input terminals; a reference voltage source; said first input terminal being coupled to said reference voltage source, said second input terminal being coupled to the output of said peak reader; means responsive to said energized output of said balancing amplifier for varying said emitted X-ray beam in a manner tending to reduce any difference in signals between said first and second balancing amplifier input terminals.

4. Apparatus for providing visual images of an X-rayed object comprising an X-ray generator adapted to emit a beam of X-rays through said object in response to a trigger signal; trigger means adapted to provide a series of trigger signals to said X-ray generator; a source of high voltage coupled to said X-ray generator; the quantum energy of said X-rays in said beam being related to the value of said high voltage; an image intensifier element having an input phosphor and an output phosphor, said input phosphor being adapted to emit light in response to X-rays impingent upon it; a photocathode included within said image intensifier element and disposed in juxtaposition to said input phosphor, said photocathode being adapted to emit electrons in response to light impingement upon it; means adapted to accelerate said emitted electrons to said output phosphor for producing a visual image thereon; signal generator means adapted to produce as an output a signal having an amplitude varying in accordance with variations in the number of electrons emitted from said photocathode; peak reader means adapted to provide as an output a voltage signal having an amplitude related to the peak amplitude of said signal generator output for the period between each of said trigger signals; a source of reference voltage; means responsive to the difference between said reference voltage and said peak reader output for varying said high voltage in a direction to reduce said difference.

5. Apparatus in accordance with claim 4 wherein said means for varying said high voltage is adapted to maintain the value of said high voltage at a value related to said peak reader output voltage for the last period between trigger pulses, until said peak reader output changes to a different value.

References Cited by the Examiner
UNITED STATES PATENTS

| | | | |
|---|---|---|---|
| 2,469,206 | 5/49 | Rich | 250—53 |
| 2,537,914 | 1/51 | Roop | 250—95 |
| 2,829,268 | 4/58 | Chope | 250—83.4 |
| 2,901,630 | 8/59 | Vossberg | 250—83.4 |
| 2,913,582 | 11/59 | Collin et al. | 250—95 |
| 2,943,205 | 6/60 | Kazan et al. | 250—213 X |
| 2,955,206 | 10/60 | Spergel | 250—83.4 |
| 2,962,594 | 11/60 | Duffy et al. | 250—95 |

FOREIGN PATENTS 706,671  3/54  Great Britain.

RALPH G. NILSON, *Primary Examiner.*

ARTHUR GAUSS, ARCHIE R. BORCHELT,
*Examiners.*